F. G. PARTINGTON.
SANITARY ANIMAL DRINKING FOUNTAIN.
APPLICATION FILED SEPT. 24, 1912.
1,087,458.
Patented Feb. 17, 1914.
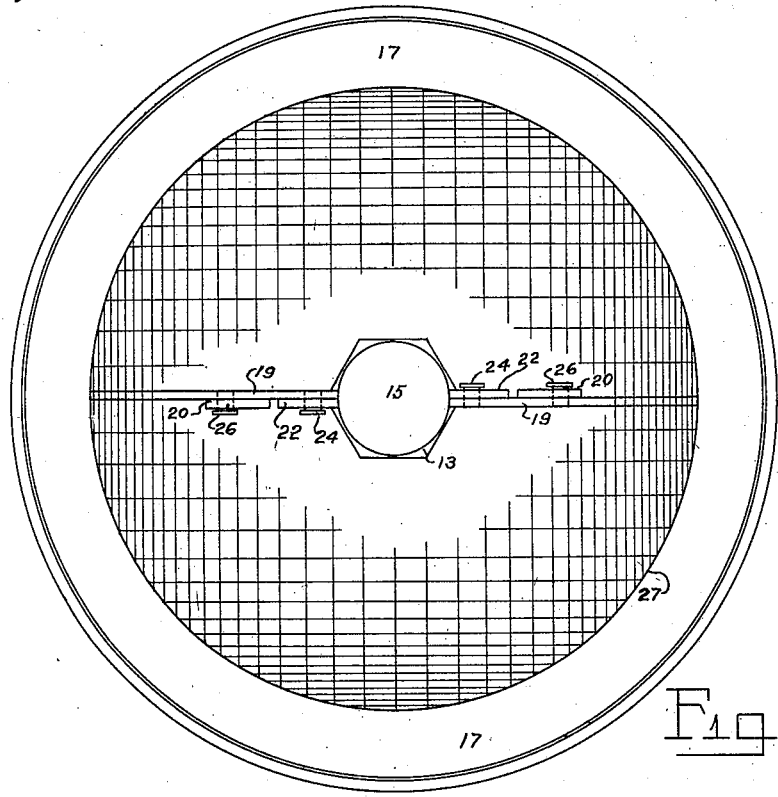
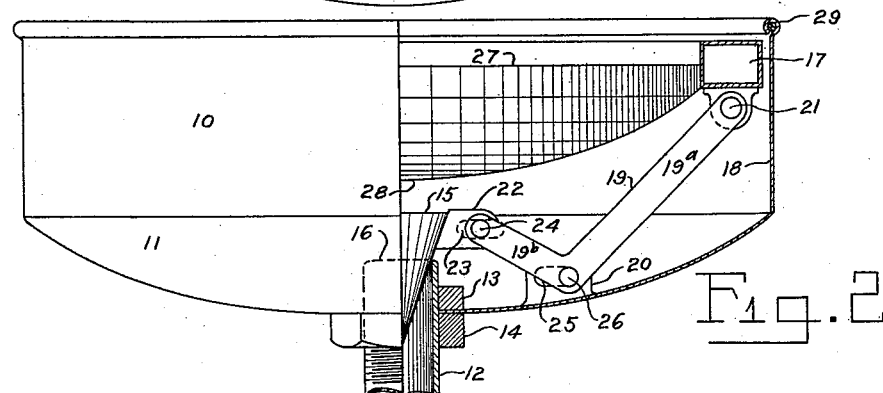
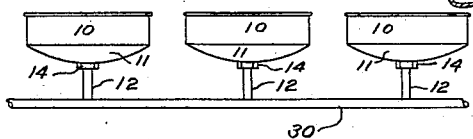

UNITED STATES PATENT OFFICE.

FREDERICK GEORGE PARTINGTON, OF COEUR D'ALENE, IDAHO.

SANITARY ANIMAL DRINKING-FOUNTAIN.

1,087,458.  Specification of Letters Patent. Patented Feb. 17, 1914.

Application filed September 24, 1912. Serial No. 722,132.

*To all whom it may concern:*

Be it known that I, FREDERICK GEORGE PARTINGTON, a citizen of the United States of America, residing at Coeur d'Alene, in the county of Kootenai and State of Idaho, have invented certain new and useful Improvements in Sanitary Animal Drinking-Fountains, of which the following is a specification.

This invention pertains to sanitary drinking fountains, and has for its object to provide an individual drinking vessel for horses, and cattle and to provide an automatic means for the flow of water into the fountain and for the cutting off of the flow when the water gets to a predetermined height in the bowl.

Other and further objects will be hereinafter described.

The apparatus consists of a bowl mounted at the desired location, a pipe feed leading into the bowl, a cutoff valve in the pipe, a float within the bowl so connected with the cutoff valve in the pipe as to automatically open and close the valve, together with a screen mounted within the bowl and covering the entire area thereof, excepting the space covered by the float.

Figure 1 is a top plan view of the device. Fig. 2 is a combined side elevation thereof and a vertical sectional view, and, Fig. 3 is a side elevation of a multiple number of the bowls mounted in a row and connected to a water feed pipe.

The bowl 10 may be made of any desired shape or design but is shown in the drawings as round with a downwardly and centrally disposed base 11. The feed pipe 12 leads into the bowl 10 at the center of the base 11 and is fitted on the inside of the bowl with a nut 13 and on the outside of the bowl with the nut 14 to make the same tight and rigid with the bowl 10. A cutoff valve 15 is mounted on the inside of the bowl 10 and is adapted to operate in the upper end of said pipe 12.

Levers 19 fulcrumed at the standards 20 are pivotally connected to the float 17 as at 21 and to an arm 22 extending across and beyond the cutoff valve 15 and rigidly secured thereto. Horizontally arranged oblong slots 23 are provided in the arm 22 in which the pin may guide in order to give the desired results in the movements of the lever 19. For a like purpose, horizontally arranged oblong slots 25 are provided in the standards 20 in which the pins 26 may glide. A screen 27 covering the area of the bowl 10 inside of the float 17 is made to swag downwardly at the center 28 thereof, giving it much the same shape of the bowl 10. A beaded rim 29 is provided for the upper edge of the bowl 10 for safety and for strength. The float 17 is mounted on the long end 19ª of the lever 19 and the cutoff valve 15 is connected with the short end 19ᵇ thereof. The screen 27 is attached to the float 17. When there is no liquid in the bowl 10 the float 17 naturally drops down causing the cutoff valve 15 to be elevated, thereby opening the pipe 12 to the inflow of water. Water rising in the bowl 10 bears against the float 17 crowding the same upwardly, until the same is in the position shown in Fig. 2 when the cutoff valve 15 closes the end 16 of the pipe 12 stopping the inflow of water. An animal drinking water from the bowl 10 thereby reducing the amount therein would cause the float 17 to drop downwardly and by the mechanism shown, cause the valve 15 to rise thereby permitting the inflow of water again until the normal height of water in the bowl 10 is reached. The screen 27 serves to catch objects dropping into the bowl and retains them until they can be removed, and serves to keep the animals from the valve 15 levers 19 and other internal mechanism. This screen serves a further purpose in this, that if for any reason the valve 15 or other connecting parts, shall become stuck in a particular position, the animal coming in contact with the screen while drinking is likely to jar the mechanism loose so that the parts will perform their usual functions.

The fountains may be mounted in rows, as shown in Fig. 3 and be placed in cow and horse stables and stalls, or other places, and all connected up to one feed pipe 30 or they may be arranged in circles or otherwise as desired and connected to the same or separate feed pipes.

What I claim is:—

1. In an animal drinking fountain, the combination of a bowl, a feed pipe therefor, a cut-off valve in said feed pipe, a float within said bowl, a screen attached to said float, and means connecting the said float with said valve.

2. In an animal drinking fountain, the combination of a bowl, a feed pipe therefor, a cut-off valve in said feed pipe, a float within said bowl, a screen attached to said float, and a bell crank lever connecting said float with said valve.

3. In an animal drinking fountain, the combination of a bowl, a feed pipe therefor, a float within said bowl, a screen attached to said float, and a cut-off valve operated by said float.

4. An animal drinking fountain comprising a bowl, a feed pipe leading into the bowl, a cutoff valve in the feed pipe, a rocking lever pivotally connected to said valve, a float within the bowl connected to the long end of said rocking lever the said lever being fulcrumed within the bowl, together with a screen within said bowl covering the substantial area thereof, the said screen being attached to the float.

In testimony whereof I affix my signature in presence of two witnesses.

FREDERICK GEORGE PARTINGTON.

Witnesses:
C. L. STARR,
WILLIAM H. KAYE.

Copies of this patent may be obtained for five cents each, by addressing the "Commissioner of Patents, Washington, D. C."